Oct. 16, 1928.
J. I. HULL
1,687,564
AUTOMATIC CONTROL OF DYNAMO ELECTRIC MACHINES
Filed July 15, 1926
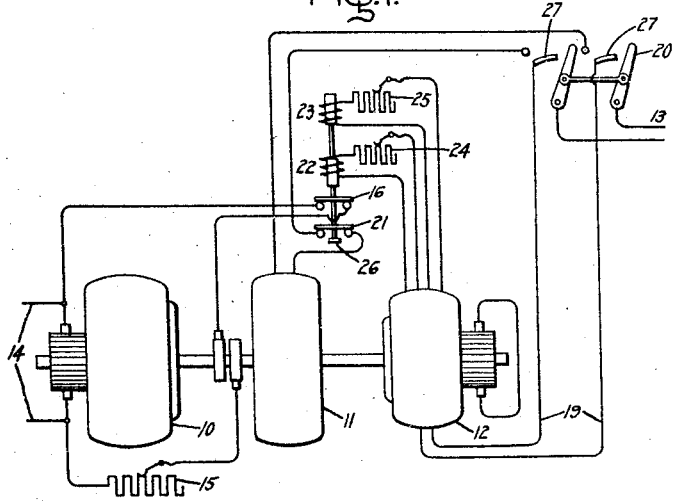
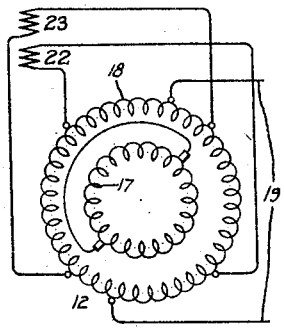
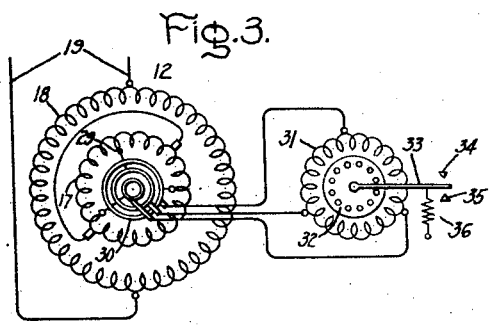
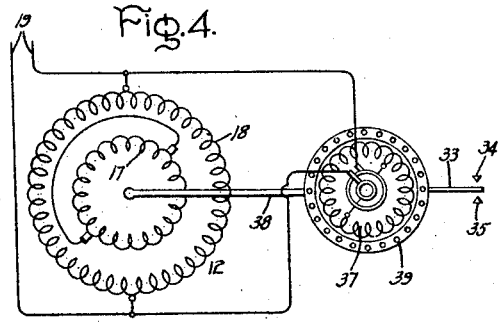
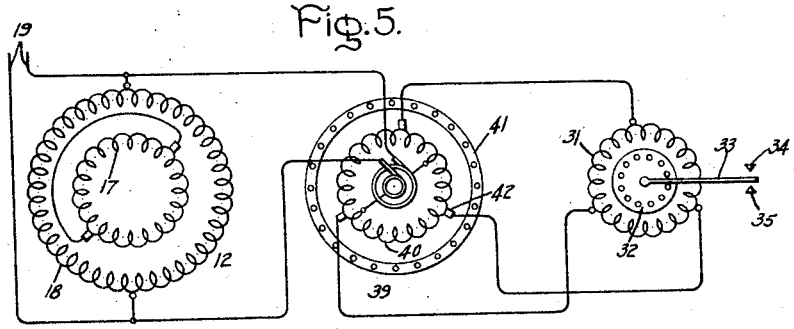
Inventor:
John I. Hull,
by *Alexander F. Smith*
His Attorney.

Patented Oct. 16, 1928.

1,687,564

UNITED STATES PATENT OFFICE.

JOHN I. HULL, OF SCHENECTADY, NEW YORK, ASSIGNOR TO GENERAL ELECTRIC COMPANY, A CORPORATION OF NEW YORK.

AUTOMATIC CONTROL OF DYNAMO-ELECTRIC MACHINES.

Application filed July 15, 1926. Serial No. 122,725.

My invention relates to a system of automatic control for alternating current dynamo electric machines and in particular to automatic relay control systems arranged to be operated at speeds proportional to a synchronous speed as distinguished from absolute speed relations of the machine to be controlled.

One example of the application of my invention is for the automatic synchronizing operations incident to the starting and synchronizing of synchronous dynamo electric machines, for example, a synchronous motor should not be connected to the line, nor its direct current field excited until it has been brought up to near its synchronous speed. Heretofore various automatic relay systems have been employed to perform the synchronizing operations of such installations. In general such systems have been operated in response to an absolute speed, as a function of current or following a predetermined time delay after an initial starting operation.

It is more desirable that the synchronizing operations be brought about at a predetermined percentage or percentages of the synchronous speed of the synchronous motor than it is to have them brought about at absolute speeds as the former method will obviate any discrepancies due to variations in frequency. Likewise, it is more desirable that such operations be made at speeds proportional to the synchronous speed of the motor rather than as a function of a predetermined time delay or of a predetermined current since the latter methods introduce discrepancies when the voltage or frequency of the power supply varies.

It is the primary object of my invention to provide automatic relay control apparatus which operates in response to a condition which is proportional to the synchronous speed of the dynamo electric machine to be controlled.

The features of my invention which are believed to be novel and patentable will be pointed out in the claims appended hereto. For a better understanding of my invention, reference is made in the following description to the accompanying drawing which shows in Fig. 1 the application of one embodiment of my invention as used to control certain synchronizing operations in connection with the starting of a motor generator set driven by a single phase synchronous motor and started by a single phase commutator motor. Fig. 2 represents the electrical connections of the energizing circuits for the relay employed in Fig. 1, and Figs. 3, 4 and 5 represent different modifications of this type of relay and the energizing circuits therefor.

Referring to the drawing and in particular to Fig. 1 thereof, I have here represented a motor generator set comprising a direct current generator 10, a single phase synchronous main driving motor 11 and a single phase commutator motor 12 for starting up the set. When direct connected, the motors 11 and 12 will generally have the same pole number and the same synchronous speed. Such a set is sometimes employed to change single phase energy to direct current energy to supply electric railway systems. The alternating current supply line is represented at 13 and the direct current feeders at 14. The direct current field current for the synchronous motor is supplied in this instance by the direct current generator 10. Included in this exciting circuit is the adjusting resistance 15 and the field switch 16. The commutator motor 12 is a usual type of single phase repulsion motor here represented as a 2-pole motor, having a commutated winding short circuited along an axis at an angle to the exciting axis. This is represented in Fig. 2 where 17 represents the short circuited commutated winding and 18 the primary stator winding with its primary leads 19. The two single phase motors 11 and 12 are supplied from the same source 13 through the line switch 20 which is arranged with extended contacts 27 so that, in closing, the starting motor 12 will receive energy before the switch is closed on contacts 28 leading to the main synchronous motor 11.

Included in the exciting and supply circuits respectively of the synchronous motor 11 is the exciting switch 16 already referred to and the main switch 21, both of which are arranged to be controlled by my improved relay system under selected speed conditions which are proportional to the synchronous speed of motor 11.

The construction of the relay shown in Fig. 1 comprises two solenoids 22 and 23 arranged to act in opposition and they move the vertical switch plunger by their joint action. It is seen that, as represented, the switch is arranged to close by gravity and that solenoid 22 is arranged to move the switch member upward to an open position. The switch bar 21 is loose on the vertical plunger and the switch bar 16 is fastened thereto so that in moving downward toward the closing position, switch 21 will close first.

The manner in which the solenoids 22 and 23 are energized to perform the desired operation will now be explained. In Fig. 2 it is seen that the coil of solenoid 23 is connected to the stator winding of the single phase commutator motor on the axis of the commutator short circuit and that the coil of solenoid 22 is connected to the stator winding at right angle to the first mentioned axis. The single phase repulsion motor may be considered to have two single phase fields in space and time quadrature with each other. At standstill one of the fields is zero and at synchronous speed these two fields approximately equal one another and result in a revolving field like that of a polyphase induction motor. At any intermediate speed the field which is zero at standstill has a value proportional to the speed in question. Therefore, the total flux of the motor may be considered to consist of a normal revolving flux like that of a polyphase motor which is proportional to the speed, and of a single phase flux along a non-short-circuited axis of the machine which is proportional to the slip. By tapping the stator winding along two axes in quadrature to each other, as shown in Fig. 2, one axis being that in which the single phase flux is a maximum at standstill and zero at synchronous speed, it is possible to obtain two voltages one of which is proportional to the speed and the other of which is approximately constant or proportional to the slip plus the speed.

In Figs. 1 and 2, solenoid 23 is connected across the axis which is at zero voltage at standstill and solenoid 22 is connected across the axis which is at maximum voltage at standstill. It will therefore be seen that as soon as the single phase motor is energized when at standstill, the solenoid 22 will be strongly energized and move switches 16 and 21 to open positions. As the speed increases, the action of solenoid 22 remains about the same and that of solenoid 23 increases so that at a certain percentage of synchronous speed the switch will start to move downward toward the closed position, first closing the main switch 21, and finally, as synchronous speed is closely approached, closing the field switch 16. Preferably, adjustable resistances 24 and 25 are included in the solenoid circuits for setting the speed point at which the switch 16 will close and the retaining nut 26 on the bottom of the vertical switch plunger for switch bar 21 may then be adjusted to set the speed point at which this switch will close with respect to switch 16. The complete starting operation may be described as follows: The line switch 20 is closed on to contacts 27. The motor 12 and solenoid 22 immediately receive energy and switches 16 and 21 open. The switch 20 may then be completely closed. Motor 12 starts the set and as the speed approaches synchronous speed, solenoid 23 receives energy and its pull equals that of solenoid 22. Switch 21 moves to the closed position and energizes the alternating current windings of the main motor 11. The speed increases and the field switch 16 is closed, connecting the synchronous motor for normal operation. Various additional refinements may be included in the synchronizing operation to be controlled by the relay of my invention, such as closing the field circuit of generator 10, and its line switch, cutting out resistance in the circuit of motor 12 and similar operations ordinarily included in the starting up of such a set and which should be performed in a certain sequence and at definite percentages of full synchronous speed. Several similar relays differently adjusted may be added if desired. It is evident that the synchronizing operations will always be performed in a desired sequence and at the proper percentage of synchronous speed irrespective of ordinary frequency and voltage variations of the source 13. It is also evident that if the voltage of source 13 should be so low as to fail to bring the set up to the proper synchronizing speed with respect to the frequency, the relay will not close the switches 16 and 21 and damage to the apparatus from such causes is therefore avoided.

As represented in Fig. 1, the starting motor 12 is left in circuit and helps to drive the set. Now, if while in normal operation, the load on the set should become so heavy as to cause the synchronous motor to drop out of synchronism, and slow down the relay due to its connection with the repulsion motor would open first the field switch 16 and then the main switch 21, thereby preventing injury to the apparatus due to overload.

In Figs. 3, 4 and 5 I have shown other ways of constructing and connecting up the relay to perform the same function, namely an operating function which is proportional to the synchronous speed of the dynamo electric machine with which it is associated. In these figures 12, 17, 18 and 19 have the same meaning as in Fig. 2, namely the single phase commutator motor, the rotor and stator windings of this motor and its supply leads.

In Fig. 3, the rotor winding of the repulsion motor is tapped at three equally distant points 29 and connected to slip rings 30. The relay in this case comprises a structure similar to a polyphase induction motor having a stator winding 31 and a squirrel cage rotor 32. The slip rings 30 are connected in a polyphase relation to the stator winding 31. The rotor 32 is constrained to a small angle of movement and provided with a contact arm 33 arranged to move between stationary contacts 34 and 35. Due to the absence of any rotating field flux in the single phase commutator machine 12 at standstill, the relay will not have any torque under such conditions and the arm 13 may then rest on contact 35, either by gravity or by a spring 36. As soon as the motor 12 starts, the rotating field flux is set up and gives the relay a torque which may be such as to rotate arm 33 in contact with 34. When the motor 12 reaches synchronous speed the frequency of the voltages set up by its revolving field at the slip rings becomes zero and consequently the torque of the relay disappears and if the motor 12 runs above synchronous speed, the torque of the relay reverses. The balance of torque between spring 36 and the relay itself could be arranged to occur at any desired percentage of synchronous speed, or at the synchronous speed as desired.

In Fig. 4 the relay is made up of a single phase rotor 37 provided with slip rings and is connected by a shaft 38 so as to be driven with the motor 12. The winding of rotor 37 will be of the same pole number as that of motor 12 for this direct connection. The winding 37 is connected in parallel with the primary of motor 12. The stator comprises a squirrel cage structure 39 arranged to be rotated through a small angle and is provided with a contact arm 33 cooperating with stationary contacts 34 and 35. At standstill, the torque is that of a single phase motor and is zero. As soon as motor 12 starts the relay develops torque which again becomes zero at synchronous speed and reverses in direction for speeds of motor 12 above synchronism. If the winding 37 of this relay is of a different pole number than motor 12, the reversal of its torque would occur at a different speed than the synchronous speed of motor 12. The same result could be accomplished by suitable gearing between motor 12 and the rotor 37 of the relay.

In Fig. 5 the motor 12 drives a converter 39 having a single phase rotor 40 supplied from a single phase source through slip rings. The stator comprises a squirrel cage structure 41 to provide a polyphase short-circuit whereby a rotating field flux may be set up in the converter at other than synchronous speed, or at standstill. For more positive action the structure 41 may be free to rotate. The relay of this figure is similar to that shown in Fig. 3 and is supplied from stationary commutator brushes 42 on the converter 39. The relay may thus be placed at any convenient point.

If motors 12 of Figs. 4 and 5 are polyphase motors, a polyphase source of energy will be available for the relay, with avoidance of zero torque at standstill and without need for part 41 of Fig. 5.

In accordance with the provisions of the patent statutes I have described the principle of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States, is:—

1. In combination with a single phase commutator motor, a source of supply therefor, an electric relay provided with a pair of energizing windings, one of said windings being electrically connected to said motor so that it is energized in proportion to the percentage of the synchronous operating speed of said motor, and the other winding being electrically connected to said motor so as to be energized in proportion to the slip plus the synchronous speed of said motor.

2. A single phase commutator motor of the repulsion type, adapted to have its primary winding energized along one axis and having its commutator short-circuited along a different axis, an electric relay provided with a pair of opposed solenoids, and connections for energizing said solenoids from the primary winding of said motor along axes which are substantially in quadrature relation to each other, one of said axes being that of the commutator short circuit.

3. In combination, a single phase synchronous motor, a single phase commutator motor mechanically connected with said synchronous motor for starting the same, a single phase source of supply for both of said motors, an automatic switch in the supply leads of said synchronous motor, a relay for operating said switch and electrical connections for energizing said relay from said commutator motor, such that said switch is operated at a definite percentage of the synchronous speed of said commutator motor.

4. In combination with a single phase dynamo electric machine having a primary winding which has points across which the voltage decreases as the speed of the motor is increased toward synchronism and other points across which the voltage increases relative to the first mentioned voltage as the speed of the motor is increased towards synchronism, and an electric relay having opposed solenoids connected to be energized from said two sets of points.

5. In combination a single phase dynamo electric machine having a stationary exciting winding which has portions across which the voltage for a given exciting voltage varies directly with the speed of the machine and other portions across which the voltage is substantially independent of the speed for a given exciting voltage and electric relay means energized from both of said portions for performing operations at definite percentages of the synchronous speed of said machine.

In witness whereof, I have hereunto set my hand this 14th day of July, 1926.

JOHN I. HULL.